US012643144B2

(12) United States Patent
Kume et al.

(10) Patent No.: US 12,643,144 B2
(45) Date of Patent: Jun. 2, 2026

(54) RARE EARTH SINTERED MAGNET

(71) Applicant: SHIN-ETSU CHEMICAL CO., LTD., Tokyo (JP)

(72) Inventors: Tetsuya Kume, Echizen (JP); Tetsuya Ohashi, Echizen (JP); Koichi Hirota, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 536 days.

(21) Appl. No.: 17/781,621

(22) PCT Filed: Dec. 7, 2020

(86) PCT No.: PCT/JP2020/045456

§ 371 (c)(1),
(2) Date: Jun. 1, 2022

(87) PCT Pub. No.: WO2021/117672

PCT Pub. Date: Jun. 17, 2021

(65) Prior Publication Data

US 2022/0415551 A1 Dec. 29, 2022

(30) Foreign Application Priority Data

Dec. 13, 2019 (JP) ................................ 2019-225356

(51) Int. Cl.

| | |
|---|---|
| ***B22F 3/24*** | (2006.01) |
| ***B22F 3/16*** | (2006.01) |
| ***C22C 38/00*** | (2006.01) |
| ***C22C 38/02*** | (2006.01) |
| ***C22C 38/06*** | (2006.01) |
| ***C22C 38/10*** | (2006.01) |
| ***C22C 38/14*** | (2006.01) |
| ***C22C 38/16*** | (2006.01) |
| ***H01F 1/057*** | (2006.01) |

(52) U.S. Cl.

CPC .................. *B22F 3/24* (2013.01); *B22F 3/16* (2013.01); *C22C 38/001* (2013.01); *C22C 38/002* (2013.01); *C22C 38/005* (2013.01); *C22C 38/02* (2013.01); *C22C 38/06* (2013.01); *C22C 38/10* (2013.01); *C22C 38/14* (2013.01); *C22C 38/16* (2013.01); *H01F 1/0577* (2013.01); *B22F 2003/248* (2013.01); *B22F 2201/20* (2013.01); *B22F 2202/05* (2013.01); *B22F 2301/355* (2013.01); *C22C 2202/02* (2013.01)

(58) Field of Classification Search

None

See application file for complete search history.

(56) References Cited

U.S. PATENT DOCUMENTS

| | | | | |
|---|---|---|---|---|
| 4,975,129 | A * | 12/1990 | Fujimura | .............. H01F 1/0577 75/246 |
| 2015/0170810 | A1 | 6/2015 | Miwa et al. | |
| 2016/0027564 | A1 | 1/2016 | Une et al. | |
| 2017/0018342 | A1 | 1/2017 | Fukagawa et al. | |
| 2017/0250015 | A1 | 8/2017 | Miwa et al. | |
| 2018/0090250 | A1 | 3/2018 | Ohashi et al. | |
| 2018/0286545 | A1 * | 10/2018 | Fujikawa | ............ H01F 41/0293 |

FOREIGN PATENT DOCUMENTS

| | | | |
|---|---|---|---|
| JP | 2015-179841 | A | 10/2015 |
| JP | 2016-164958 | A | 9/2016 |
| JP | 2017-157833 | A | 9/2017 |
| JP | 2018-56188 | A | 4/2018 |
| WO | WO2006/044348 | A2 | 4/2006 |

(Continued)

OTHER PUBLICATIONS

English language machine translation of JP 2016164958A. Generated Sep. 27, 2024. (Year: 2024).*

(Continued)

*Primary Examiner* — Brian D Walck

(74) *Attorney, Agent, or Firm* — Birch, Stewart, Kolasch & Birch, LLP

(57) ABSTRACT

The present invention provides a rare earth sintered magnet which contains R (R represents one or more rare earth elements essentially including Nd), T (T represents one or more iron group elements essentially including Fe), B, $M^1$ ($M^1$ represents one or more elements selected from among Al, Si, Cr, Mn, Cu, Zn, Ga, Ge, Mo, Sn, W, Pb and Bi) and $M^2$ ($M^2$ represents one or more elements selected from among Ti, V, Zr, Nb, Hf and Ta), while comprising an $R_2T_{14}B$ phase as the main phase. This rare earth sintered magnet is characterized in that: the $M^1$ is in an amount of from 0.5% by atom to 2% by atom; if (R), (T), ($M^2$) and (B) are the respective atomic percentages of the above-described R, T, $M^2$ and B, the relational expression (1) $((T)/14)+(M^2) \leq (B) \leq ((R)/2)+((M^2)/2)$ is satisfied; and from 0.1% by volume to 10% by volume of all grain boundary phases in the magnet is composed of an $R_6T_{13}M^1$ phase. This rare earth sintered magnet is able to achieve excellent magnetic characteristics including a good balance between high Br and high $H_{cJ}$.

11 Claims, No Drawings

(56) References Cited

FOREIGN PATENT DOCUMENTS

| | | | |
|---|---|---|---|
| WO | WO2013/191276 | A1 | 12/2013 |
| WO | WO2014/142137 | A1 | 9/2014 |

OTHER PUBLICATIONS

Murray et al. "Preparation and Characterization of Pure Metals." ASM Handbook, vol. 2: Properties and Selection: Nonferrous Alloys and Special-Purpose Materials. pp. 1093-1097. 1990. (Year: 1990).*

International Search Report for PCT/JP2020/045456 mailed on Feb. 22, 2021.

Written Opinion of the International Searching Authority for PCT/JP2020/045456 mailed on Feb. 22, 2021.

Office action issued Sep. 27, 2022, in Japanese Patent Application No. 2019-225356.

Extended European Search Report for European Application No. 20900196.5, dated Oct. 11, 2023.

Chinese Office Action for Chinese Application No. 202080085849.7, dated Jan. 11, 2025, with an English translation.

* cited by examiner

RARE EARTH SINTERED MAGNET

TECHNICAL FIELD

This invention relates to a rare earth sintered magnet having excellent magnetic properties including both high Br and high $H_{cJ}$.

BACKGROUND ART

Rare earth sintered magnets are a class of functional material which is essential for energy saving and greater functionality, and their application range and production quantity are annually expanding. Among rare earth sintered magnets, Nd-based sintered magnets, referred to as Nd magnets, hereinafter, have a high remanence (designated Br, hereinafter). They are used, for example, in drive motors in hybrid cars and electric vehicles, motors in electric power steering systems, motors in air conditioner compressors, and voice coil motors (VCM) in hard disk drives. While Nd magnets having high Br are used in motors for various applications, Nd magnets having higher values of Br are desired for manufacturing motors of smaller size.

On the other hand, rare earth sintered magnets reduce their coercivity (designated $H_{cJ}$, hereinafter) at high temperature, with irreversible thermal demagnetization taking place. For this reason, the rare earth sintered magnets intended for use in motors mounted on various vehicles, especially electric vehicles are required to have higher values of $H_{cJ}$.

Although it is a common practice in the prior art to add heavy rare earth elements such as Dy and Tb for enhancing the $H_{cJ}$ of Nd magnets, this approach is not always regarded preferable because heavy rare earth elements are rare resources and expensive and the addition of such elements can invite a drop of Br.

Another known means for enhancing the $H_{cJ}$ of Nd magnets is size reduction of crystal grains. This means mainly intends to reduce the particle size of fine powder during fine pulverization of the starting alloy prior to shaping, thereby obtaining crystal grains of small size at the end of sintering. It is known that in a certain range of particle size, $H_{cJ}$ increases in linear proportion to a size reduction. When a magnet material is finely pulverized below a certain level, a lowering of the pulverizing capability during fine pulverization and the concentration of impurities (mainly oxygen and nitrogen) in the finely pulverized material becomes high as a result of an increase of reactivity of finely pulverized material. As a result, the $H_{cJ}$ of Nd magnet lowers, or even when an increase of $H_{cJ}$ is observed, it is difficult to achieve an increase of $H_{cJ}$ by the grain boundary diffusion technique (to be described later). For ameliorating these problems, Patent Document 1 discloses to change the jet gas during fine pulverization to an inert gas such as He or Ar.

The other method of enhancing the $H_{cJ}$ of Nd magnets is known from Patent Document 2 which relates to a method of letting a heavy rare earth element (e.g., Dy or Tb) selectively collect at grain boundary phase in the Nd magnet (referred to as grain boundary diffusion technique, hereinafter). This method involves the steps of depositing a compound of heavy rare earth element such as Dy or Tb onto the magnet surface as by coating, and effecting heat treatment at high temperature. For main phase grains in the Nd magnet, a structure having a high concentration of Dy or Tb is formed only in a region of a main phase grain in close vicinity to the grain boundary. This enables to achieve a high $H_{cJ}$ enhancement effect while restraining a drop of Br.

A method of enhancing $H_{cJ}$ without using heavy rare earth elements such as Dy and Tb is recently proposed. Patent Documents 3 and 4 disclose to control the grain boundary structure within a magnet by utilizing $R_6Fe_{13}M$ phase wherein M is such an element as Si or Ga. This method intends to enhance $H_{cJ}$ by introducing element M such as Si or Ga into a magnet composition, introducing element X which is B and C in an amount below the stoichiometry of the main phase, $R_2Fe_{14}X$ phase, and causing $R_6Fe_{13}M$ phase to precipitate in the grain boundary phase in the magnet so as to continuously cover the main phase.

PRIOR ART DOCUMENTS

Patent Documents

Patent Document 1: WO 2014/142137
Patent Document 2: WO 2006/044348
Patent Document 3: JP-A 2018-56188
Patent Document 4: WO 2013/191276

SUMMARY OF INVENTION

Technical Problem

However, the method of changing the jet gas for fine pulverization to inert gas such as He or Ar, which is proposed in Patent Document 1, is difficult to comply with industrial production when a cost difference from nitrogen gas is taken into account. Also, although Patent Document 3 proposes the method of subjecting a magnet of $R_6Fe_{13}M$ phase precipitation type to grain boundary diffusion treatment for achieving a high $H_{a}$j while suppressing the amount of heavy rare earth element used, there is a problem that since the amount of X in the magnet falls below the stoichiometry and is short, the amount of $R_2Fe_{14}X$ phase which is main phase of Nd magnet formed in the magnet is reduced to invite a drop of Br, as pointed out in Patent Document 4. This indicates the tradeoff relation between high Br and high $H_{cJ}$. It is difficult to achieve both high Br and high $H_{cJ}$ at the same time.

An object of the invention, which has been made under the above-mentioned circumstances, is to provide a Nd-base sintered magnet exhibiting both high Br and high $H_{cJ}$ in an effective manner.

Solution to Problem

Making extensive investigations to attain the above object with a focus on the composition of Nd-base sintered magnet, especially the influence of B amount and element M (e.g., Si or Ga) on precipitation of $R_6T_{13}M$ phase and their relation to magnetic properties wherein T is an iron group element, essentially including Fe, and M is an element such as Si or Ga, the inventors have found that when the amounts of these elements are adjusted to appropriate ranges, a high Br is achievable by forming a sufficient amount of $R_2Fe_{14}X$ phase, and at the same time, a high $H_{cJ}$ is achievable by causing a heavy rare earth-concentrated phase resulting from grain boundary diffusion and a necessary minimum amount of $R_6T_{13}M$ phase to precipitate at the grain boundary portion in the magnet structure. The invention is predicated on this finding.

Accordingly, the invention provides a rare earth sintered magnet as defined below.

[1]

A rare earth sintered magnet comprising R, T, B, $M^1$, and $M^2$ wherein R is at least one element selected from rare earth elements, essentially including Nd, T is at least one element selected from iron group elements, essentially including Fe, $M^1$ is at least one element selected from Al, Si, Cr, Mn, Cu, Zn, Ga, Ge, Mo, Sn, W, Pb, and Bi, and $M^2$ is at least one element selected from Ti, V, Zr, Nb, Hf, and Ta, the magnet having the main phase in the form of $R_2T_{14}B$ phase, containing 0.5 to 2.0 at % of $M^1$, and meeting the relationship (1):

$$([T]/14)+[M^2]\leq[B]\leq([R]/2)+([M^2]/2) \quad (1)$$

wherein [R], [T], [$M^2$], and [B] represent atom percents of R, T, $M^2$, and B, respectively, and $R_6T_{13}M^1$ phase accounting for 0.1 to 10% by volume of the overall grain boundary phases in the magnet.

[2]

The rare earth sintered magnet of [1] wherein the content of R is 12.5 to 16.0 at %, the content of B is 5.5 to 8.0 at %, the content of $M^1$ is 0.5 to 2.0 at %, and the content of $M^2$ is up to 0.5 at %.

[3]

The rare earth sintered magnet of [1] or [2], containing up to 0.1% by weight of O, up to 0.05% by weight of N, and up to 0.07% by weight of C.

[4]

The rare earth sintered magnet of any one of [1] to [3], having an average crystal grain size of up to 4 μm.

[5]

The rare earth sintered magnet of any one of [1] to [4] wherein within at least 500 μm from the surface of the magnet, at least a portion near the surface of a main phase grain includes a region having a higher concentration of $R^1$ than the center of the main phase grain wherein $R^1$ is at least one element selected from rare earth elements, constituting at least part of R.

[6]

The rare earth sintered magnet of any one of [1] to [5] wherein $R^1$ has been introduced into the magnet after sintering by grain boundary diffusion.

Advantageous Effects of Invention

Now that the element composition, especially the content of element $M^1$ which is at least one element selected from Al, Si, Cr, Mn, Cu, Zn, Ga, Ge, Mo, Sn, W, Pb, and Bi is adjusted, and the relation among the contents of element R which is at least one element selected from rare earth elements, essentially including Nd, element T which is at least one element selected from iron group elements, essentially including Fe, element $M^1$ which is at least one element selected from Al, Si, Cr, Mn, Cu, Zn, Ga, Ge, Mo, Sn, W, Pb, and Bi, element $M^2$ which is at least one element selected from Ti, V, Zr, Nb, Hf, and Ta, and B is adjusted to a specific optimum range, the rare earth sintered magnet of the invention exhibits excellent magnetic properties including both high Br and high $H_{cJ}$.

DESCRIPTION OF EMBODIMENTS

The invention provides a rare earth sintered magnet comprising R, T, B, $M^1$, and $M^2$ wherein R is at least one element selected from rare earth elements, essentially including Nd, T is at least one element selected from iron group elements, essentially including Fe, $M^1$ is at least one element selected from Al, Si, Cr, Mn, Cu, Zn, Ga, Ge, Mo, Sn, W, Pb, and Bi, and $M^2$ is at least one element selected from Ti, V, Zr, Nb, Hf, and Ta.

R is at least one element selected from rare earth elements, essentially including neodymium (Nd), as mentioned above. Although the content of R is not particularly limited, the R content is preferably at least 12.5 at %, more preferably at least 13.0 at %, from the aspects of restraining crystallization of α-Fe in molten alloy and promoting normal densification during sintering. Also, the R content is preferably up to 16.0 at %, more preferably up to 15.5 at %, from the aspect of acquiring high Br.

Although the proportion of Nd in R is not particularly limited, it is preferably at least 60 at %, more preferably at least 75 at % of the overall R elements. Although R elements other than Nd are not particularly limited, preferably Pr, Dy, Tb, Ho, Ce, and Y are contained.

T is at least one element selected from iron group elements, i.e., Fe, Co, and Ni, essentially including iron (Fe). The content of T is the balance of R, $M^1$, $M^2$, and B, and preferably from 70 at % to 80 at %. Notably, the content of Fe is preferably from 70 at % to 85 at %, more preferably from 75 at % to 80 at % of the overall rare earth magnet.

Though not particularly limited, the content of B is preferably at least 5.5 at %, more preferably at least 5.8 at %, even more preferably at least 6.0 at %, from the aspect of fully forming the main phase to acquire a Br. In consideration of the influence on Br of precipitation of $Nd_1Fe_4X_4$ phase (wherein X is B, or B and C) in the case of too high B contents, the content of B is preferably up to 8.0 at %, more preferably up to 7.0 at %, even more preferably up to 6.5 at %.

$M^1$ is at least one element selected from Al, Si, Cr, Mn, Cu, Zn, Ga, Ge, Mo, Sn, W, Pb, and Bi, as mentioned above, which forms $R_6T_{13}M^1$ phase. The content of $M^1$ is preferably at least 0.5 at %, more preferably at least 0.8 at %, even more preferably at least 1.0 at %, from the aspect of ensuring a sufficient range of optimum temperature during heat treatment to acquire a satisfactory productivity and the aspect of restraining a decline of $H_{cJ}$. Also, the $M^1$ content is preferably up to 2.0 at %, more preferably up to 1.5 at %, even more preferably up to 1.4 at %, from the aspect of providing a high Br. If the $M^1$ content is less than 0.5 at %, it is difficult to form a sufficient amount of $R_6T_{13}M^1$ phase, failing to acquire a satisfactory $H_{cJ}$. If the $M^1$ content exceeds 2.0 at %, the amount of the main phase or $R_2T_{14}B$ phase formed is reduced, with a decline of Br.

In the rare earth sintered magnet of the invention, the $R_6T_{13}M^1$ phase is formed as the grain boundary phase. The $R_6T_{13}M^1$ phase accounts for 0.1 to 10% by volume, preferably 1.0 to 8.0% by volume of the overall grain boundary phases in the magnet. If the proportion or occupancy of $R_6T_{13}M^1$ phase is less than 0.1% by volume of the overall grain boundary phases, a satisfactory value of $H_{cJ}$ is not available. If the proportion exceeds 10% by volume, the amount of the main phase or $R_2T_{14}B$ phase formed is reduced, with a decline of Br. In either case, the object of the invention is sometimes unattainable.

The volume proportion of $R_6T_{13}M^1$ phase in the grain boundary phases may be determined, for example, by the following procedure. First, the structure of a sintered magnet is observed by an electron probe micro analyzer (EPMA). From the reflection electron composition image and semi-quantitative analysis results, the $R_6T_{13}M^1$ phase is identified and the area proportion of $R_6T_{13}M^1$ phase in the overall grain boundary phases of the magnet is measured by image analysis. This measurement is carried out at various sites of the sintered magnet, and an average value thereof is defined as the volume proportion. The number of measurements is, for example, totally approximately 1,000 grains in images of different 10 sites, which are averaged.

$M^2$ is at least one element selected from Ti, V, Zr, Nb, Hf, and Ta, as mentioned above. $M^2$ is included from the aspect of preventing crystal grains from abnormal growth during the sintering step. Though not particularly limited, the content of $M^2$ is preferably up to 0.5 at %, more preferably up to 0.3 at %, even more preferably up to 0.2 at %, from the aspect of preventing $M^2$-B phase formed by $M^2$ element from inviting drop of Br due to reduce the proportion of $R_2T_{14}B$ phase.

In the magnet of the invention, the contents of R, T, $M^2$, and B are adjusted to meet the relationship (1):

$$([T]/14)+[M^2] \leq [B] \leq ([R]/2)+([M^2]/2) \quad (1)$$

wherein [R], [T], [$M^2$], and [B] represent atom percents of R, T, $M^2$, and B, respectively.

As long as the above relationship is fulfilled, high Br and high $H_{cJ}$ are obtainable. Though not well understood, the reason is presumed as follows. The relationship (1) indicates that the content of B is above the stoichiometry. It is known that $M^2$ element such as Ti, Zr or Nb often forms a $M^2$-B2 phase with B. As a result of extensive investigation, the inventors have discovered that depending on the microstructure of the rare earth sintered magnet, $M^2$ element also forms a $M^2$-B phase which is unstable in the magnet. With this taken into account, B is added in an amount necessary to form a phase with $M^2$ element, from which the relationship (1) is devised. That is, if the B content is less than ([T]/14)+[$M^2$], the $R_2T_{14}B$ phase which is main phase is insufficiently formed, resulting in a low Br. If the B content is more than ([R]/2)+([$M^2$]/2), a $R_1T_4B_4$ phase is excessively formed, resulting in a low Br. In either case, it is difficult to attain the object of the invention.

In addition to the constitutional elements, the rare earth sintered magnet of the invention may contain O, N and C. The content of O is preferably up to 0.1% by weight, more preferably up to 0.08% by weight. The content of N is preferably up to 0.05% by weight, more preferably up to 0.03% by weight. The content of C is preferably up to 0.07% by weight, more preferably up to 0.05% by weight. If the C content exceeds 0.07% by weight, sometimes $H_{cJ}$ declines. As long as the contents of O, N and C are within the above ranges, satisfactory magnetic properties, especially satisfactory $H_{cJ}$ are surely obtained. Although it is preferred in the invention that the contents of O, N and C be as low as possible, generally these elements are incidental and difficult to completely remove.

In addition to the aforementioned elements, the rare earth sintered magnet may contain such elements as H, F, Mg, P, S, Cl and Ca as impurities which are incidental from the production aspect. With respect to the content of these incidental impurities, up to 0.1% by weight of total incidental impurities based on the total of the constitutional elements and incidental impurities is permissible although the content of incidental impurities is preferably as low as possible.

The rare earth sintered magnet should preferably have an average crystal grain size of up to 4 μm, more preferably up to 3.5 μm although the grain size is not critical. By adjusting the average crystal grain size to this range, satisfactory magnetic properties, especially satisfactory $H_{cJ}$ are surely obtained. The average crystal grain size may be measured, for example, by the following procedure. First, a cross section of a sintered magnet is polished to mirror finish. The magnet is immersed in an etchant, for example, Vilella reagent (mixture of glycerol, nitric acid and hydrochloric acid in a ratio of 3:1:2) to selectively etch the grain boundary phase. The etched cross section is observed under a laser microscope. An image analysis is made on the image observed, and the cross-sectional area of individual grains is measured, from which the diameter of equivalent circle is computed. An average grain size is computed based on the data of the area fraction of each grain size. The average grain size is preferably an average of many grains in images of plural spots, for example, an average of total approximately 2,000 grains in images of different 20 spots.

Next, the method of preparing the rare earth sintered magnet of the invention is described.

The method of preparing the rare earth sintered magnet involves steps which are basically similar to the steps used in the conventional powder metallurgy method and not particularly limited. Generally, the method involves the steps of melting raw materials to form a starting alloy having a predetermined composition, pulverizing the starting alloy into an alloy fine powder, compression shaping the alloy fine powder under a magnetic field into a compact, and heat treating the compact into a sintered magnet.

First, in the melting step, metals or alloys as raw materials for necessary elements are weighed so as to meet the predetermined composition. After weighing, the raw materials are melted, for example, by high-frequency induction heating. The melt is cooled to form a starting alloy. For casting of the starting alloy, the melt casting technique of casting in a flat mold or book mold or the strip casting technique is generally employed. Also applicable herein is a so-called two-alloy technique involving separately furnishing an alloy approximate to the $R_2Fe_{14}B$ compound composition that constitutes the main phase of Nd magnet and an R-rich alloy serving as liquid phase aid at the sintering temperature, crushing, then weighing and mixing them. Since the alloy approximate to the main phase composition tends to allow α-Fe phase to crystallize depending on the cooling rate during casting and the alloy composition, the alloy is preferably subjected to homogenizing treatment in vacuum or Ar atmosphere at 700 to 1,200° C. for at least 1 hour, if desired, for the purpose of homogenizing the structure to eliminate the α-Fe phase. When the alloy approximate to the main phase composition is prepared by the strip casting technique, the homogenizing treatment may be omitted. To the R-rich alloy serving as liquid phase aid, not only the casting technique mentioned above, but also the so-called melt quenching technique are applicable.

The pulverizing step may be a multi-stage step including, for example, coarse pulverizing and fine pulverizing steps. In the coarse pulverizing step, for example, a jaw crusher, Brown mill or pin mill, or hydrogen decrepitation may be used. In the practice of the invention, hydrogen decrepitation is preferably employed for the purpose of reducing O, N and C contents to acquire improved magnetic properties though not critical. Particularly when the alloy has been formed by strip casting, hydrogen decrepitation is preferably applied. Typically, a coarse powder which has been coarsely pulverized to a size of 0.05 to 3 mm, especially 0.05 to 1.5 mm is obtained.

In the fine pulverizing step, a technique of pulverizing the coarse powder, for example, on a jet mill using a non-oxidative gas stream such as $N_2$, He or Ar may be employed. In the fine pulverizing step, the coarse powder is preferably pulverized to a size of 0.2 to 15 μm, more preferably 0.5 to 10 μm. Since impurities O and N in the rare earth sintered magnet are mainly introduced in the fine pulverizing step, the jet mill atmosphere must be controlled for the O and N contents in the magnet can be adjusted. The O content in the rare earth sintered magnet is adjusted by controlling the O content and the dew point of the jet mill atmosphere. Preferably the pulverization atmosphere is controlled to an oxygen concentration of up to 1 ppm and a dew point of −60° C. or lower.

Also, the N content in the rare earth sintered magnet may be adjusted, for example, by (A) a technique of finely pulverizing on a jet mill with He or Ar gas jet, (B) a technique of finely pulverizing on a jet mill with $N_2$ gas jet while introducing hydrogen, or (C) a technique of finely pulverizing hydrogen-containing coarse powder on a jet mill with $N_2$ gas jet. When technique (B) of introducing hydrogen gas or technique (C) of using hydrogen-containing coarse powder is used, hydrogen preferentially adsorbs to the active surface created by pulverizing action to prevent adsorption of nitrogen, for thereby reducing the N content in the rare earth sintered magnet.

In either one or both of the steps of coarsely and finely pulverizing the starting alloy, a lubricant such as a saturated fatty acid or ester thereof may be added for enhancing the orientation or alignment of particles during the subsequent step of shaping the powder in a magnetic field. In the lubricant adding step, there arises the ambivalent problem that increasing the amount of the lubricant added is generally effective for promoting orientation, but carbon originating from the lubricant forms more R-CON phase in the rare earth sintered magnet to bring about a considerable drop of $H_{cJ}$. When the fine powder resulting from technique (C) of finely pulverizing hydrogen-containing coarse powder is used herein, the amount of the lubricant added to the fine powder is preferably increased for promoting orientation. In the method of preparing the rare earth sintered magnet from such fine powder, since internal hydrogen is released during heat treatment, the hydrogen acts to decompose the lubricant (having chemically adsorbed to fine particle surfaces) through carbonyl reductive reaction or the like, and hydrogen gas-induced cracking reaction forces further decomposition and dissociation to highly volatile lower alcohols. Consequently, the C content remaining in the rare earth sintered magnet is reduced.

In the shaping step, the alloy powder is compression shaped into a compact by a compression shaping machine while applying a magnetic field of 400 to 1,600 kA/m for orienting or aligning powder particles in the direction of axis of easy magnetization. The compact preferably has a density of 2.8 to 4.2 g/cm$^3$. The compact preferably has a density of at least 2.8 g/cm$^3$ from the aspect of establishing a compact strength for easy handling. For further increasing the strength of the compact as shaped, a binder such as PVA or fatty acid may be added to the powder. Also, the compact preferably has a density of up to 4.2 g/cm$^3$ from the aspects of establishing a sufficient compact strength and preventing any disordering of particle orientation during compression to acquire an appropriate Br. The shaping step is preferably performed in an inert gas atmosphere such as nitrogen or Ar gas to prevent the alloy fine powder from oxidation.

The heat treatment step is to sinter the compact resulting from the shaping step in a non-oxidative atmosphere such as Ar gas or in high vacuum. In the inventive method using the hydrogen-containing coarse powder resulting from technique (C), the compact is preferably held at 200 to 600° C. for 5 minutes to 10 hours in a non-oxidative atmosphere or low vacuum atmosphere to prevent the occurrence of cracks due to a temperature drop and temperature difference in the compact associated with the release (endothermic reaction) of hydrogen gas in the compact, before the compact is fired. Most often, the sintering step is preferably carried out by holding at a temperature of 950° C. to 1,200° C. for 0.5 to 10 hours. Subsequently, the sintered body may be heat treated at a temperature lower than the sintering temperature for the purpose of enhancing $H_{cJ}$. This heat treatment after sintering may be heat treatment in two stages including high-temperature heat treatment and low-temperature heat treatment or a single low-temperature heat treatment. The high-temperature heat treatment is preferably to heat treat the sintered body at a temperature of 600 to 950° C. The low-temperature heat treatment is preferably to heat treat the sintered body at a temperature of 400 to 600° C.

In this way, a rare earth sintered magnet within the scope of the invention is obtained. For the rare earth sintered magnet, the average crystal grain size can be easily measured, for example, through observation under a laser microscope as mentioned above. Specifically, the average grain size is determined by grinding and mirror finishing the magnet, etching the surface with an etchant such as Nital solution or Vilella reagent, taking a reflection electron image of the etched surface, and performing image analysis.

In a further embodiment, the rare earth sintered magnet thus obtained is subjected to grain boundary diffusion treatment, specifically ground to a desired shape, covered with a diffusion source, and further heat treated in the state that the diffusion source is present on the magnet surface. The diffusion source is one or more members selected from oxides of $R^2$, fluorides of $R^3$, oxyfluorides of $R^4$, hydroxides of $R^5$, carbonates of $R^6$, basic carbonates of $R^7$, single metal or alloys of $R^8$ wherein each of $R^2$ to $R^8$ is at least one element selected from rare earth elements. The means of securing the diffusion source to the magnet surface may be a dip coating technique of dipping the sintered magnet in a slurry of the powdered diffusion source to coat the magnet with the slurry and drying, a screen printing technique, or a dry coating technique such as sputtering or pulsed laser deposition (PLD). The temperature of grain boundary diffusion treatment is lower than the sintering temperature and preferably at least 700° C. From the aspect of obtaining the sintered magnet having improved structure and magnetic properties, the treatment time is preferably 5 minutes to 80 hours, more preferably 10 minutes to 50 hours, though not particularly limited. The grain boundary diffusion treatment causes $R^2$ to $R^8$ to diffuse from the coating to the magnet for thereby achieving a further increase of $H_{cJ}$. Although the rare earth element to be introduced by the grain boundary diffusion treatment is designated $R^2$ to $R^8$ for the sake of description, any of $R^2$ to $R^8$ is included in the R component in the rare earth sintered magnet at the end of grain boundary diffusion treatment. The diffusion source containing $R^2$ to $R^8$ is preferably a metal, compound or intermetallic compound containing at least one element selected from Dy, Tb and Ho because these elements are more effective for increasing $H_{cJ}$.

The invention requires only that the rare earth sintered magnet meet the element composition and relationship (1). Although it is unnecessary that the magnet contains $R^1$ introduced by grain boundary diffusion as the R element, it is preferred from the aspect of obtaining higher $H_{cJ}$ that the magnet also contain $R^1$ introduced by grain boundary diffusion. Notably, $R^1$ collectively represents elements $R^2$ to $R^8$ introduced by grain boundary diffusion. The magnet subjected to grain boundary diffusion has a characteristic distribution of R concentration. That is, within at least 500 μm from the surface of the magnet having the diffusion source deposited thereon, there is formed the structure that at least a portion near the surface of a main phase grain includes a region having a higher concentration of $R^1$ than the center of the main phase grain.

EXAMPLES

Examples and Comparative Examples are given below for further illustrating the invention, but the invention is not limited thereto.

Examples 1, 2 and Comparative Examples 1, 2

By furnishing Nd metal, Pr metal, Dy metal, ferroboron alloy, electrolytic Co, Al metal, Cu metal, Ga metal, Si metal, Zr metal, and electrolytic iron (all metals are of purity ≥99%), weighing and mixing them in a predetermined ratio, melting them, and casting by the strip casting method, there was obtained a starting alloy in flake form having a thickness of 0.2 to 0.4 mm. The flake form starting alloy was pulverized by hydrogen decrepitation in a pressurized hydrogen atmosphere into coarse pulverized powder. To 100% by weight of the coarse pulverized powder, 0.20% by weight of stearic acid as lubricant was added and mixed. Using a jet mill, the mix was subjected to dry pulverization in a nitrogen stream, obtaining fine pulverized powder (alloy powder) having a pulverization particle size $D_{50}$ of 2.8 to 3.0 μm. It is noted that the pulverization particle size $D_{50}$ is a volume basis median diameter determined by the laser diffraction method based on gas stream dispersion.

A mold of a shaping machine was filled with the fine pulverized powder in inert gas atmosphere. While being oriented under a magnetic field of 15 kOe (1.19 MA/m), the powder was compression shaped in a direction perpendicular to the magnetic field. The resulting compact had a density of 3.0 to 4.0 g/cm$^3$. The compact was held in Ar atmosphere at 600° C. for 2 hours, then sintered in vacuum at a temperature of 1,040 to 1,080° C. (a temperature selected for each sample such that sufficient densification is achieved by sintering) for 5 hours, yielding a Nd magnet block. The Nd magnet block had a density of at least 7.5 g/cm$^3$.

The Nd magnet block was subjected to metal component analysis by an inductively coupled plasma optical emission spectrometer (ICP-OES). It was also analyzed for oxygen, carbon and nitrogen by infrared absorption gas analysis. The results are shown in Table 1. It is noted that the data in Table 1 are at %. Also, the Nd magnet block was observed under a laser microscope to determine an average crystal grain size, with the results shown in Table 2. The Nd magnet block was machined into a parallelopiped shape sample of 15 mm by 7 mm by 12 mm. The sample was measured for Br and $H_{cJ}$ by a BH tracer, with the results shown in Table 2.

The Nd magnet block was machined to a parallelopiped shape block of 20 mm by 20 mm by 2.2 mm. The block was immersed in a slurry which was obtained by mixing terbium oxide particles having an average particle size of 0.5 μm with ethanol at a weight fraction of 50%. By coating the slurry and drying, a coating of terbium oxide was formed on the surface of the Nd magnet block. The Nd magnet block having the coating was subjected to high-temperature heat treatment including heating in vacuum at 950° C. for 5 hours and cooling down to 200° C. at a cooling rate of 20° C./min, for grain boundary diffusion of terbium. Next, the Nd magnet block was subjected to low-temperature heat treatment including heating at 450° C. for 2 hours and cooling down to 200° C. at a cooling rate of 20° C./min, obtaining a Nd sintered magnet. A parallelopiped piece of 6 mm by 6 mm by 2 mm was cut out of a center portion of the Nd sintered magnet and measured for $H_{cJ}$ by a pulse tracer, with the results shown in Table 2. The structure of the magnet piece was observed by EPMA. From the reflection electron composition image and semi-quantitative analysis results, the $R_6T_{13}M^1$ phase was identified and the proportion of $R_6T_{13}M^1$ phase in the overall grain boundary phases of the magnet was measured by image analysis. The results are shown in Table 2. It is noted that in Table 2, the mark "○" designates that the requirement of the invention is fulfilled and the mark "×" designates that the requirement of the invention is not fulfilled.

TABLE 1

| | Nd | Pr | Fe | Co | Cu | Zr | Al | B | Si | Ga | O | N | C |
|---|---|---|---|---|---|---|---|---|---|---|---|---|---|
| Comparative Example 1 | 11.38 | 3.15 | 76.96 | 0.50 | 0.63 | 0.14 | 0.20 | 5.51 | 0.12 | 0.73 | 0.32 | 0.08 | 0.24 |
| Comparative Example 2 | 11.38 | 3.16 | 76.91 | 0.49 | 0.62 | 0.14 | 0.20 | 5.62 | 0.12 | 0.73 | 0.28 | 0.09 | 0.27 |
| Example 1 | 11.37 | 3.14 | 76.86 | 0.49 | 0.62 | 0.14 | 0.17 | 5.75 | 0.12 | 0.72 | 0.28 | 0.09 | 0.27 |
| Example 2 | 11.36 | 3.15 | 76.71 | 0.49 | 0.62 | 0.14 | 0.20 | 5.84 | 0.12 | 0.73 | 0.29 | 0.09 | 0.25 |

(at %)

TABLE 2

| | Average crystal grain size (μm) | Proportion of $R_6T_{13}M^1$ phase in grain boundary phases (vol %) | Relationship (1) | $M^1$ content | Br (kG) | $H_{cJ}$ before grain boundary diffusion (kOe) | $H_{cJ}$ after grain boundary diffusion (kOe) |
|---|---|---|---|---|---|---|---|
| Comparative Example 1 | 3.6 | 18 | x | ○ | 13.31 | 19.6 | 28.3 |
| Comparative Example 2 | 3.5 | 12 | x | ○ | 13.54 | 18.8 | 28.6 |
| Example 1 | 3.6 | 7 | ○ | ○ | 13.81 | 17.5 | 28.4 |
| Example 2 | 3.6 | 3 | ○ | ○ | 13.92 | 15.6 | 28.8 |

Examples 3 to 5 and Comparative Examples 3, 4

A magnet was prepared by the same procedure as in Example 1. In comparison with Example 1, the amounts of Nd and Pr were reduced, and the amount of Fe was increased as shown in Table 3. The amount of B was changed as shown in Table 3. The thus obtained magnets were measured for average crystal grain size, proportion (or occupancy) of $R_6T_{13}M^1$ phase, $M^1$ content, Br, and $H_{cJ}$ as in Example 1. The results are shown in Table 4. It is noted that in Table 4, the mark "○" designates that the requirement of the invention is fulfilled and the mark "×" designates that the requirement of the invention is not fulfilled.

TABLE 3

| | Nd | Pr | Fe | Co | Cu | Zr | Al | B | Si | Ga | O | N | C |
|---|---|---|---|---|---|---|---|---|---|---|---|---|---|
| Comparative Example 3 | 10.97 | 3.08 | 77.70 | 0.53 | 0.20 | 0.14 | 0.24 | 5.56 | 0.12 | 0.71 | 0.39 | 0.13 | 0.24 |
| Comparative Example 4 | 10.71 | 3.11 | 77.95 | 0.50 | 0.19 | 0.15 | 0.24 | 5.68 | 0.14 | 0.72 | 0.32 | 0.10 | 0.21 |
| Example 3 | 10.83 | 3.16 | 77.68 | 0.50 | 0.20 | 0.14 | 0.27 | 5.81 | 0.12 | 0.72 | 0.29 | 0.09 | 0.26 |
| Example 4 | 10.87 | 3.10 | 77.72 | 0.50 | 0.20 | 0.15 | 0.17 | 5.90 | 0.12 | 0.72 | 0.32 | 0.09 | 0.25 |
| Example 5 | 10.92 | 3.11 | 77.35 | 0.50 | 0.19 | 0.14 | 0.24 | 6.04 | 0.12 | 0.73 | 0.32 | 0.14 | 0.26 |

(at %)

TABLE 4

| | Average crystal grain size (μm) | Proportion of $R_6T_{13}M^1$ phase in grain boundary phases (vol %) | Relationship (1) | $M^1$ content | Br (kG) | $H_{cJ}$ before grain boundary diffusion (kOe) | $H_{cJ}$ after grain boundary diffusion (kOe) |
|---|---|---|---|---|---|---|---|
| Comparative Example 3 | 3.5 | 16 | x | ○ | 13.70 | 18.0 | 26.2 |
| Comparative Example 4 | 3.6 | 11 | x | ○ | 13.84 | 18.0 | 27.2 |
| Example 3 | 3.6 | 6 | ○ | ○ | 14.11 | 17.0 | 28.0 |
| Example 4 | 3.5 | 4 | ○ | ○ | 14.19 | 16.0 | 28.5 |
| Example 5 | 3.6 | 3 | ○ | ○ | 14.12 | 15.8 | 28.3 |

A comparison of Examples 1 to 5 with Comparative Examples 1 to 4 reveals that when not only the specific content of $M^1$ is fulfilled, but relationship (1) is also fulfilled (Examples 1 to 5), high values of Br and $H_{cJ}$ are obtained. The inclusion of B in excess of the stoichiometry makes the amount of $R_6T_{13}M^1$ phase formed to be necessary minimum for thereby suppressing a decline of Br and achieving high values of $H_{cJ}$ in a consistent manner. In contrast, when relationship (1) is not fulfilled and B is below the stoichiometry (Comparative Examples 1 to 4), high values of $H_{cJ}$ are achieved due to formation of $R_6T_{13}M^1$ phase, but an outstanding drop of Br occurs due to the reduced amount of the main phase, $R_2T_{14}B$ phase.

Examples 6 to 9 and Comparative Examples 5, 6

A magnet was prepared by the same procedure as in Example 1. In comparison with Example 1, the amounts of Nd and Pr were reduced, and the amount of Fe was increased as shown in Table 5. The thus obtained magnets were measured for average crystal grain size, proportion of $R_6T_{13}M^1$ phase, $M^1$ content, Br, and $H_{cJ}$ as in Example 1. The results are shown in Table 6. It is noted that in Table 6, the mark "○" designates that the requirement of the invention is fulfilled and the mark "×" designates that the requirement of the invention is not fulfilled.

TABLE 5

| | Nd | Pr | Fe | Co | Cu | Zr | Al | B | Si | Ga | O | N | C |
|---|---|---|---|---|---|---|---|---|---|---|---|---|---|
| Comparative Example 5 | 11.03 | 2.93 | 78.31 | 0.49 | 0.18 | 0.14 | 0.24 | 5.91 | 0.02 | 0.00 | 0.35 | 0.08 | 0.31 |
| Example 6 | 10.92 | 3.01 | 77.98 | 0.65 | 0.19 | 0.15 | 0.22 | 5.85 | 0.05 | 0.28 | 0.33 | 0.11 | 0.27 |
| Example 7 | 10.91 | 3.03 | 77.92 | 0.54 | 0.18 | 0.14 | 0.22 | 5.85 | 0.02 | 0.46 | 0.34 | 0.11 | 0.27 |
| Example 8 | 11.07 | 3.00 | 77.60 | 0.51 | 0.19 | 0.14 | 0.22 | 5.81 | 0.05 | 0.75 | 0.31 | 0.11 | 0.26 |
| Example 9 | 11.17 | 3.04 | 77.08 | 0.52 | 0.19 | 0.14 | 0.22 | 5.82 | 0.05 | 1.13 | 0.30 | 0.11 | 0.23 |
| Comparative Example 6 | 11.02 | 3.03 | 76.51 | 0.50 | 0.19 | 0.15 | 0.22 | 5.83 | 0.02 | 1.70 | 0.30 | 0.11 | 0.22 |

(at %)

TABLE 6

| | Average crystal grain size (μm) | Proportion of $R_6T_{13}M^1$ phase in grain boundary phases (vol %) | Relationship (1) | $M^1$ content | Br (kG) | $H_{cJ}$ before grain boundary diffusion (kOe) | $H_{cJ}$ after grain boundary diffusion (kOe) |
|---|---|---|---|---|---|---|---|
| Comparative Example 5 | 3.5 | 0 | ○ | x | 14.32 | 14.8 | 24.7 |
| Example 6 | 3.6 | 2 | ○ | ○ | 14.27 | 16.4 | 27.1 |
| Example 7 | 3.6 | 3 | ○ | ○ | 14.23 | 16.4 | 27.3 |
| Example 8 | 3.6 | 5 | ○ | ○ | 14.12 | 16.0 | 27.7 |
| Example 9 | 3.5 | 9 | ○ | ○ | 14.02 | 16.2 | 28.4 |
| Comparative Example 6 | 3.5 | 14 | ○ | x | 13.72 | 16.3 | 28.5 |

A comparison of Examples 6 to 9 with Comparative Examples 5, 6 reveals that when the amount of element $M^1$ is small (Comparative Example 5), no $R_6T_{13}M^1$ phase is formed, failing to obtain high $H_{cJ}$. When the amount of element $M^1$ is large (Comparative Example 6), a larger amount of $R_6T_{13}M^1$ phase is formed, and the amount of the main phase is reduced, with an outstanding drop of Br. When both the requirements of relationship (1) and $M^1$ content are fulfilled, high Br and high $H_{cJ}$ are obtained as seen from Examples 6 to 9.

It has been demonstrated that the magnets of Examples 1 to 9 meeting the requirements of the invention show values of $H_{cJ}$ after grain boundary diffusion in excess of 27 kOe, and are fully useful in the application requiring high heat resistance, typically electric vehicles. Also, values of Br in excess of 13.7 kG are obtained, indicating possible size reduction of motors or the like.

The invention claimed is:

1. A rare earth sintered magnet consisting of

R, T, B, $M^1$, $M^2$, O, N, C and impurities incidental from the production aspect wherein R is Nd and optionally at least one element selected from rare earth elements other than Nd, T is Fe and optionally at least one element selected from Co and Ni, $M^1$ is at least one element selected from Al, Si, Cr, Mn, Cu, Zn, Ga, Ge, Mo, Sn, W, Pb, and Bi, and $M^2$ is at least one element selected from V, Zr, Nb, Hf, and Ta, the magnet having the main phase in the form of $R_2T_{14}B$ phase, containing 0.5 to 2.0 at % of $M^1$ and 0.14 to 0.5 at % of $M^2$, and meeting the relationship (1):

$$([T]/14)+[M^2] \le [B] \le ([R]/2)+([M^2]/2) \tag{1}$$

wherein [R], [T], [$M^2$], and [B] represent atom percents of R, T, $M^2$, and B, respectively, and $R_6T_{13}M^1$ phase accounting for 0.1 to 10% by volume of the overall grain boundary phases in the magnet.

2. The rare earth sintered magnet of claim 1 wherein the content of R is 12.5 to 16.0 at %, and the content of B is 5.5 to 8.0 at %.

3. The rare earth sintered magnet of claim 1, containing up to 0.1% by weight of O, up to 0.05% by weight of N, and up to 0.07% by weight of C.

4. The rare earth sintered magnet of claim 1, having an average crystal grain size of up to 4 μm.

5. The rare earth sintered magnet of claim 1 wherein within at least 500 μm from the surface of the magnet, at least a portion near the surface of a main phase grain includes a region having a higher concentration of $R^1$ than the center of the main phase grain wherein $R^1$ is at least one element selected from rare earth elements, constituting at least part of R.

6. The rare earth sintered magnet of claim 5 wherein $R^1$ has been introduced into the magnet after sintering by grain boundary diffusion.

7. The rare earth sintered magnet of claim 1 wherein the $R_6T_{13}M^1$ phase accounts for 2 to 10% by volume of the overall grain boundary phases in the magnet.

8. The rare earth sintered magnet of claim 1 wherein the $R_6T_{13}M^1$ phase accounts for 3 to 10% by volume of the overall grain boundary phases in the magnet.

9. The rare earth sintered magnet of claim 1 wherein the $R_6T_{13}M^1$ phase accounts for 3 to 9% by volume of the overall grain boundary phases in the magnet.

10. The rare earth sintered magnet of claim 1 wherein the $R_6T_{13}M^1$ phase accounts for 3 to 9% by volume of the overall grain boundary phases in the magnet, the content of R is 12.5 to 16.0 at %, and the content of B is 5.5 to 8.0 at %, the rare earth sintered magnet contains up to 0.1% by weight of O, up to 0.05% by weight of N, and up to 0.07% by weight of C, the rare earth sintered magnet has an average crystal grain size of up to 4 μm, within at least 500 μm from the surface of the magnet, at least a portion near the surface of a main phase grain includes a region having a higher concentration of $R^1$ than the center of the main phase grain wherein $R^1$ is at least one element selected from rare earth elements, constituting at least part of R, and $R^1$ has been introduced into the magnet after sintering by grain boundary diffusion.

11. The rare earth sintered magnet of claim 1, wherein the impurities which incidental from the production aspect are one or more elements selected from H, F, Mg, P, S, Cl and Ca.

* * * * *